United States Patent [19]
Parks et al.

[11] Patent Number: 5,623,700
[45] Date of Patent: Apr. 22, 1997

[54] INTERFACE CIRCUIT HAVING ZERO LATENCY BUFFER MEMORY AND CACHE MEMORY INFORMATION TRANSFER

[75] Inventors: Terry J. Parks, Round Rock; Craig S. Jones; Darius D. Gaskins, both of Austin, all of Tex.

[73] Assignee: Dell, USA L.P., Round Rock, Tex.

[21] Appl. No.: 223,874

[22] Filed: Apr. 6, 1994

[51] Int. Cl.⁶ .................................................. G06F 13/14
[52] U.S. Cl. .......................................................... 395/873
[58] Field of Search ....................... 364/DIG. 1, DIG. 2; 395/440, 465, 468, 469, 470, 471, 472, 473, 375, 200, 821, 827, 838, 842, 841, 840, 872, 873

[56] References Cited

U.S. PATENT DOCUMENTS 4,835,686  5/1989  Furuya et al. ........................ 395/463
5,170,299  12/1992  Moon ................................ 360/77.08
5,241,546  8/1993  Peterson et al. ...................... 371/37.1
5,255,136  10/1993  Machado et al. .................... 360/77.02

*Primary Examiner*—Robert B. Harrell

[57] ABSTRACT

A caching disk controller is provided which includes a bus bridge that forms an interface between a memory of the disk controller and a host computer. The caching disk controller further includes a SCSI processor for controlling the transfer of data from a SCSI disk drive to the memory via a local bus. A zero latency DMA controller embodied within the bus bridge snoops the local bus as data is being transferred from the SCSI disk drive to the memory, and thereby allows the data to be sequentially latched within a data FIFO of the bus bridge concurrently with its transfer into the memory. As a result, the requested data may be advantageously provided from the bus bridge to the host computer with reduced delay, while the data continues to be stored within the memory to accommodate high hit rates during subsequent transfers.

24 Claims, 7 Drawing Sheets

INTERFACE CIRCUIT HAVING ZERO LATENCY BUFFER MEMORY AND CACHE MEMORY INFORMATION TRANSFER

BACKGROUND OF THE INVENTION

1. Field of the Invention

This invention relates to computer systems and more particularly to buffer transfer apparatus for transferring data between a peripheral device and a host computer. The invention further relates to high performance adapter cards and disk controllers.

2. Description of the Relevant Art

High performance adapter cards such as disk controllers coordinate the transfer of data between a peripheral device and a host computer. A typical adapter card includes a RAM buffer, often in the form of a cache memory, which temporarily holds selected data prior to sending it to the host computer. For example, within a typical caching disk controller, when the host computer requests a sector which is not contained by the cache, the disk controller causes the sector to be read from the disk and to be transferred into the cache. When the transfer into the cache is complete, the disk controller initiates a transfer of the sector from the cache to the host computer. The sector of data is transferred into the cache to achieve high cache-hit rates during subsequent disk operations. However, the step of storing the data in the cache adds considerable latency to cache misses since the miss penalty is the sum of the disk latency, the disk transfer time, and the host transfer time. This latency is particularly noticeable within caching disk controllers since a disk cache is typically associated with a line size that is greater than the average request length (i.e., a typical cache line consists of several sectors). Thus the host must wait for both the requested data as well as unrequested data (that forms a complete cache line) to be stored in the cache before the requested data can actually be transferred to the host.

The problems described, above may be better understood with reference to FIGS. 1 and 2. FIG. 1 is a block diagram of a computer system 100 including a host processor 102 and a system memory 103 coupled to a caching disk controller 104 via a host bus 106. The caching disk controller 104 is coupled to a plurality of SCSI devices 06A–106D via SCSI buses 108 and 110. The caching disk controller 104 includes a bus bridge 120 coupled to a local processor 122 and a cache memory 124 via a local bus 126. A pair of SCSI processors 128 and 130 are further coupled to local bus 126.

FIG. 2 is a block diagram of the bus bridge 120 incorporated within the caching disk controller 104 of FIG. 1. The bus bridge 120 includes a host interface 202 coupled to host bus 106, and a local interface coupled to local bus 126. A host interface register file 206 and a DMA controller 208 are coupled between local interface 204 and host interface 202.

Referring collectively to FIGS. 1 and 2, the operation of caching disk controller 104 during a read request by host processor 102 is next considered. If host processor 102 desires to read a sector of data from one of the SCSI devices 106A–106D, a sector read request is transmitted by the host processor 102 and is written into the host interface register file 206 of bus bridge 120. Bus bridge 120 responsively asserts an interrupt to alert local processor 122 of the pending request. Local processor 122 subsequently reads the pending request within the host register file 206 and, upon determining that the current request is a read request, determines whether the requested sector is contained by cache memory 124. If the sector is contained by cache memory 124, a so-called cache "hit" has occurred, and the local processor 122 causes the DMA controller 208 of bus bridge 120 to initiate a direct memory access (DMA) operation to read the requested sector directly from cache memory 124. It is noted that the latency associated with such a read request when a cache hit occurs is extremely small since the cache memory 124 is implemented using memory devices having speeds that are comparable to the speed of host processor 102. As a result, if high cache-hit rates are maintained, excellent overall read performance may be achieved.

On the other hand, if the requested sector is not contained within cache memory 124, a so-called cache "miss" has occurred and the sector must be read from the appropriate SCSI device 106A–106D. It is noted that the latency associated with a read operation from a designated SCSI device 106A–106D is much greater than the latency associated with cache memory 124, particularly for situations in which SCSI devices 106A–106D are disk drives. After local processor 122 determines that a cache-miss has occurred, it determines which of the SCSI devices 106A–106D contains the requested sector. Local processor 122 then posts a read request to the appropriate SCSI processor 128 or 130. For example, if the requested sector is contained by SCSI device 106A, local processor 122 issues a read request directed to SCSI processor 128. SCSI processor 128 responsively obtains mastership of local bus 126 and initiates a cycle to transfer the line comprising the sector of data from SCSI device 106A to cache memory 124. When the transfer of the line of data into cache memory 124 is complete, the SCSI processor 128 asserts an interrupt to local processor 122. Local processor 122 responsively causes the DMA controller 208 of bus bridge 120 to initiate a direct memory access operation to thereby transfer the sector of requested data from cache memory 124 to system memory 103. This completes the transfer as originally requested by host processor 102.

It is noted that since the requested sector is stored in the cache memory 124, subsequent read and write operations to the line that includes that sector may be serviced directly by the cache. Significant improvements in read and write performance may thereby be attained. However, as mentioned previously, a drawback to the above-described caching technique is that when a cache-miss occurs, the requested sector of data is not transferred to system memory 103 until after the entire line of data has first been transferred from the SCSI device 106A–106D into the cache memory 124. Accordingly, the host processor 102 must wait not only for the line of data to be read from the SCSI device 106A–106D but also for the requested sector of data to be read from the cache memory 124. Accordingly, overall performance of the computer system may be degraded.

SUMMARY OF THE INVENTION

The problems outlined above are in large part solved by a zero latency buffer transfer apparatus and a disk controller according to the present invention. In one embodiment, a caching disk controller includes a bus bridge that forms an interface between a cache memory of the disk controller and a host computer. The caching disk controller further includes a SCSI processor for controlling the transfer of data from a SCSI disk drive to the cache memory via a local bus. A zero latency DMA controller embodied within the bus bridge snoops the local bus as data is being transferred from the SCSI disk drive to the cache memory, and thereby allows the data to be sequentially latched within a data FIFO (first-infirst-out) of the bus bridge concurrently with its transfer into the cache memory. As a result, the requested data may be advantageously provided from the bus bridge to the host computer with reduced delay, while the data continues to be stored within the cache memory to accommodate high hit rates during subsequent transfers.

A control unit embodied within the zero latency DMA controller may be configured to assert a delay signal when the data FIFO is at or near its maximum capacity. The delay signal causes the cache memory to delay its acceptance of data, and thus allows additional time for the data to be unloaded from the data FIFO. In an alternative embodiment, a Local PCI pointer is employed to track the addresses of data being transferred to the cache memory from a SCSI disk drive. A DMA pointer is employed to track the addresses of data being latched into the data FIFO. If the data FIFO becomes full and the Local PCI pointer increments beyond the DMA pointer, the DMA controller obtains mastership of the local bus after the data FIFO releases at least some of its data to the host computer. The DMA controller then sequentially reads data from the cache memory into the data FIFO beginning at the DMA pointer address. After each transfer into the data FIFO, the DMA pointer is incremented. The data transfers from the cache memory to the data FIFO continue until the DMA pointer again equals the Local PCI pointer. At this point, the zero latency DMA controller thereafter resumes snooping the local bus and sequentially latching subsequent data into the data FIFO for transfer to the host computer until the requested transfer is complete or the FIFO again becomes full. As a result, the requested data is advantageously provided to the host computer with minimal delay, and data coherency problems are avoided even if the data FIFO becomes full.

Broadly speaking, the present invention contemplates an adapter card for providing an interface between a host bus of a host computer and a peripheral device. The adapter card comprises a local bus, a memory buffer coupled to the local bus, and at least one processing unit capable of initiating a transfer of selected data from the peripheral device to the memory buffer via the local bus. The adapter card further comprises a bus bridge coupled between the local bus and the host bus. The bus bridge includes a storage element for temporarily storing data to be transferred to the host bus from the local bus, and a control unit capable of snooping the local bus and causing the selected data to be latched into the storage element when the selected data is transferred from the peripheral device to the memory buffer.

While a preferred embodiment of the present invention contemplates the use of an adapter card as an interface, it is also in the inventor's mind to utilize adaptor circuitry, as found in the adapter card, and place such circuitry on the motherboard of a computer, or on such other mediums as may be required in the future to interface a host bus of a host computer to a peripheral device.

The invention further contemplates a disk controller for providing an interface between a host bus of a host computer and a disk drive. The disk controller comprises a local bus, a cache memory coupled to the local bus, and at least one processing unit capable of initiating a transfer of selected data from the disk drive to the cache memory via the local bus. The disk controller further comprises a bus bridge coupled between the local bus and the host bus. The bus bridge includes a data FIFO for temporarily storing data to be transferred to the host bus from the local bus, and a control unit capable of snooping the local bus and causing the selected data to be latched into the data FIFO when the selected data is transferred from the peripheral device to the cache memory.

The invention further contemplates a control unit capable of snooping the local bus, wherein the control unit is placed within local memory.

The invention finally contemplates a method of interfacing data from a peripheral device to a host computer. The method comprises the steps of providing a read request from the host computer to a bus bridge via a host bus, causing selected data to be transferred from the peripheral device to a cache memory via a local bus, and latching the selected data within a storage element of the bus bridge as the selected data is being transferred from the peripheral device to the cache memory.

BRIEF DESCRIPTION OF THE DRAWINGS

Other objects and advantages of the invention will become apparent upon reading the following detailed description and upon reference to the accompanying drawings in which.

Figure 1:
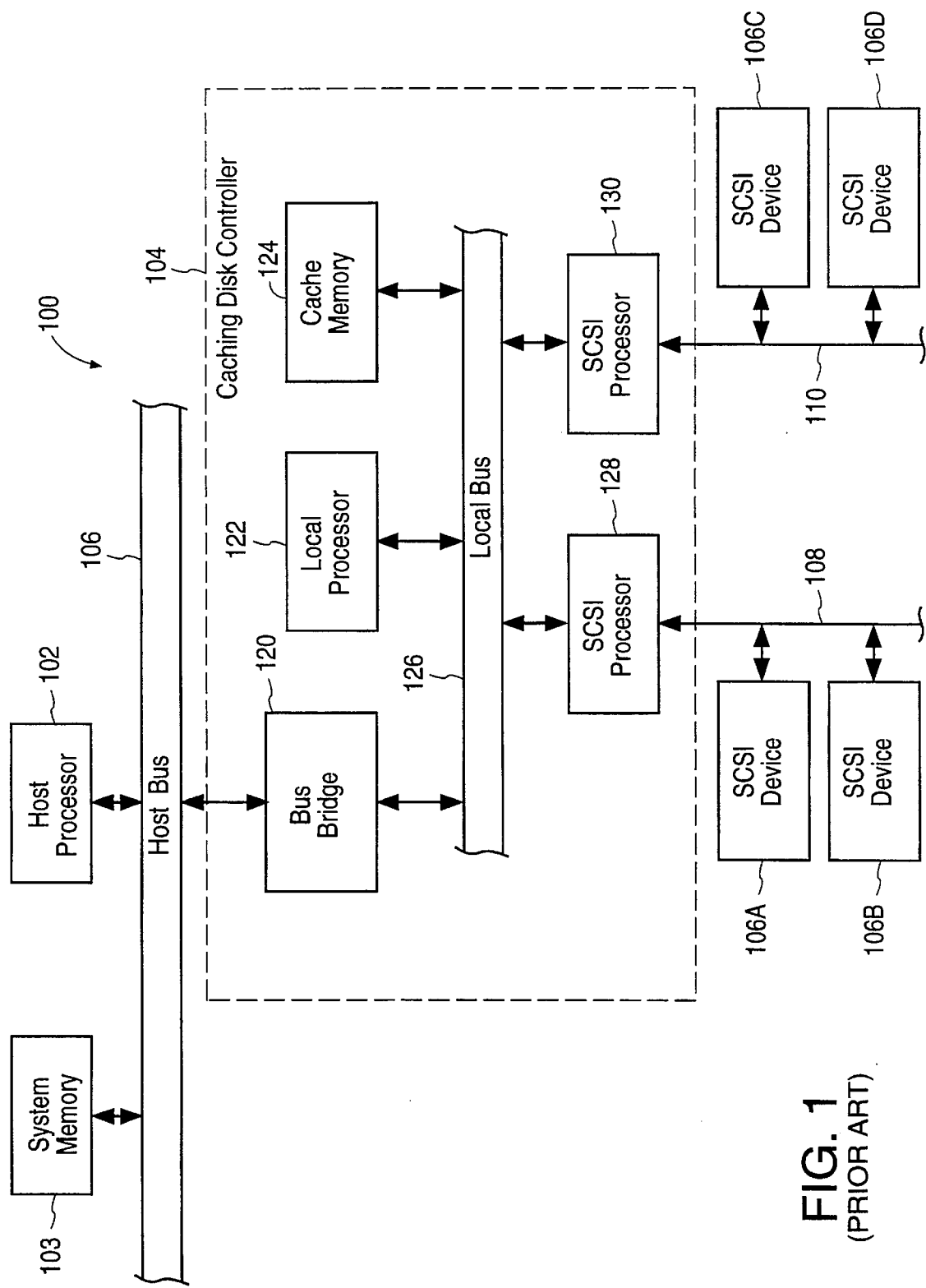
FIG. 1 is a block diagram of a computer system including a typical caching disk controller.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
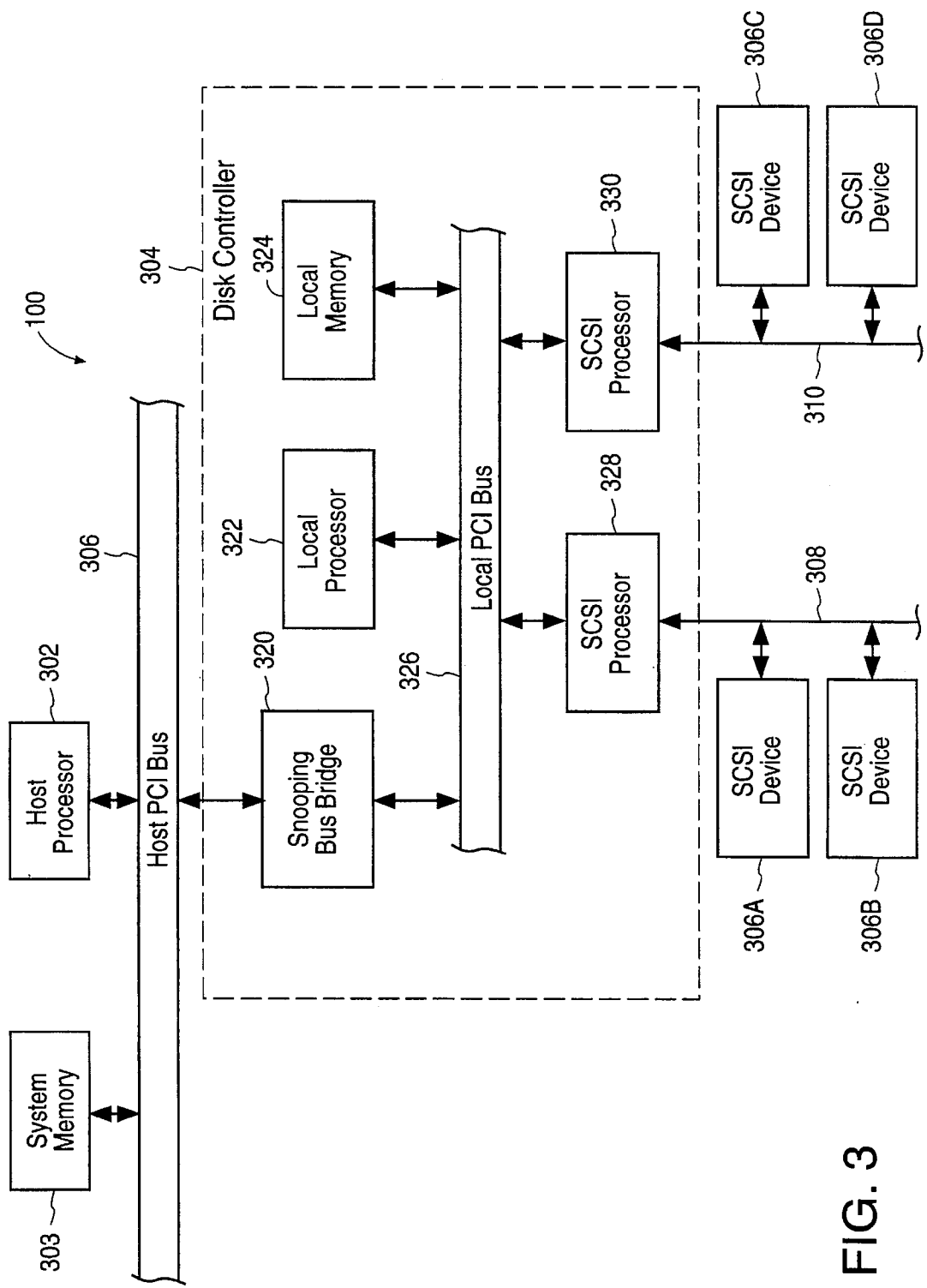
FIG. 3 is a block diagram of a computer system including a caching disk controller according to the present invention.

Turning now to FIG. 3, a block diagram is illustrated of a computer system 300 to which the present invention is adapted. Computer system 300 includes a host processor 302 and a system memory 303 coupled to a disk controller 304 via a host PCI bus 306. The disk controller 304 is coupled to a plurality of SCSI (Small Computer System Interface) devices 306A–306D via SCSI buses 308 and 310. The disk controller 304 includes a snooping bus bridge 320 coupled to a local processor 322 and a local memory 324 via a local PCI bus 326. A pair of SCSI processors 328 and 330 (NCR53C810, for example) are further coupled to local bus 326. Details regarding the operation of snooping bus bridge 320 as well as other aspects of disk controller 304 will be provided below.

SCSI processors 128 and 130 are exemplary peripheral interface processors and may be implemented using NCR53C810 type SCSI I/O processors. SCSI processors 128 and 130 control the bi-directional transfer of data to or from SCSI devices 306A–306D. Additional information regarding NCR53C810 type SCSI I/O processors may be found within the NCR53C810 Programmer's Guide and Data Manual published by NCR Corporation. This publication is incorporated herein by reference in its entirety. It is noted that NCR53C720 type SCSI I/O processors, among others, could alternately be employed. It is further noted that while the embodiment of FIG. 3 illustrates a pair of SCSI channels formed by SCSI processors 328 and 330 and by SCSI buses 308 and 310, it is specifically contemplated that any number of SCSI channels could be provided.

Host PCI bus 306 and local PCI bus 326 are each implemented in accordance with the PCI standard bus configuration. Further details regarding the PCI standard bus configuration may be found within the "PCI Local Bus Specification"; Revision 2.0; published by the PCI Special Interest Group; Hillsboro, Oreg. This document is incorporated herein by reference in its entirety. It is understood that other standard bus configurations could be alternatively employed.

Local processor 322 is a processing unit which controls well-known functions relating to local memory 324 such as cache tag comparison operations, cache replacement algorithms, and cache memory segregation. For configurations in which a plurality of SCSI hard drives are coupled to disk controller 304 to form a composite drive, local processor 322 further controls the generation and parsing of disk commands to selected drives as well as the calculation of parity data to be stored by a parity drive, if any. These functions and specific implementations thereof are well known to those of skill in the art. Local processor 122 may be implemented using, for example, a type 80960CA processor manufactured by Intel Corporation.

Figure 4:
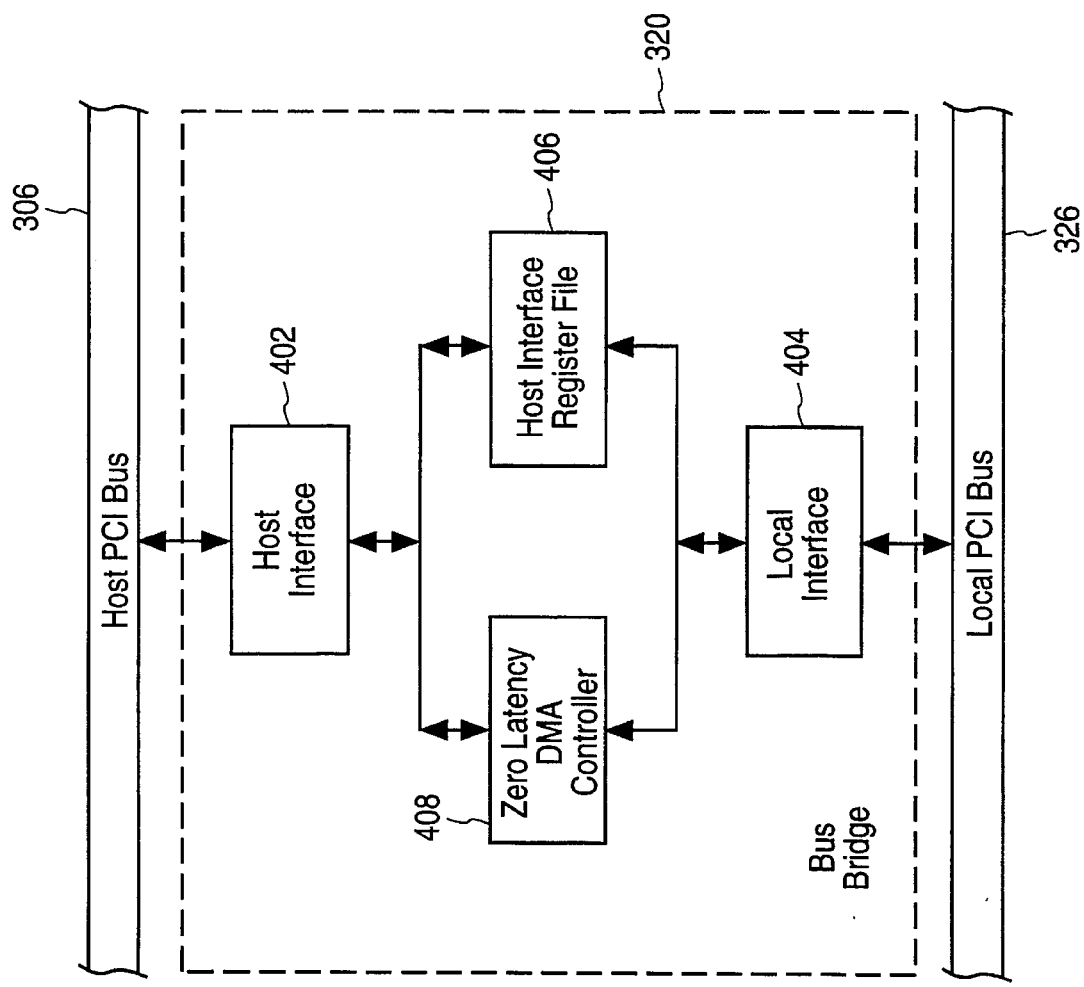
FIG. 4 is a block diagram of a snooping bus bridge incorporated as an integral part of the caching disk controller of FIG. 3.

FIG. 4 is a block diagram of the snooping bus bridge 320. The snooping bus bridge 320 includes a host interface 402 coupled to host bus 306, and a local interface coupled to local bus 326. A host interface register file 406 and a zero latency DMA controller 408 are coupled between local interface 404 and host interface 402.

Figure 2:
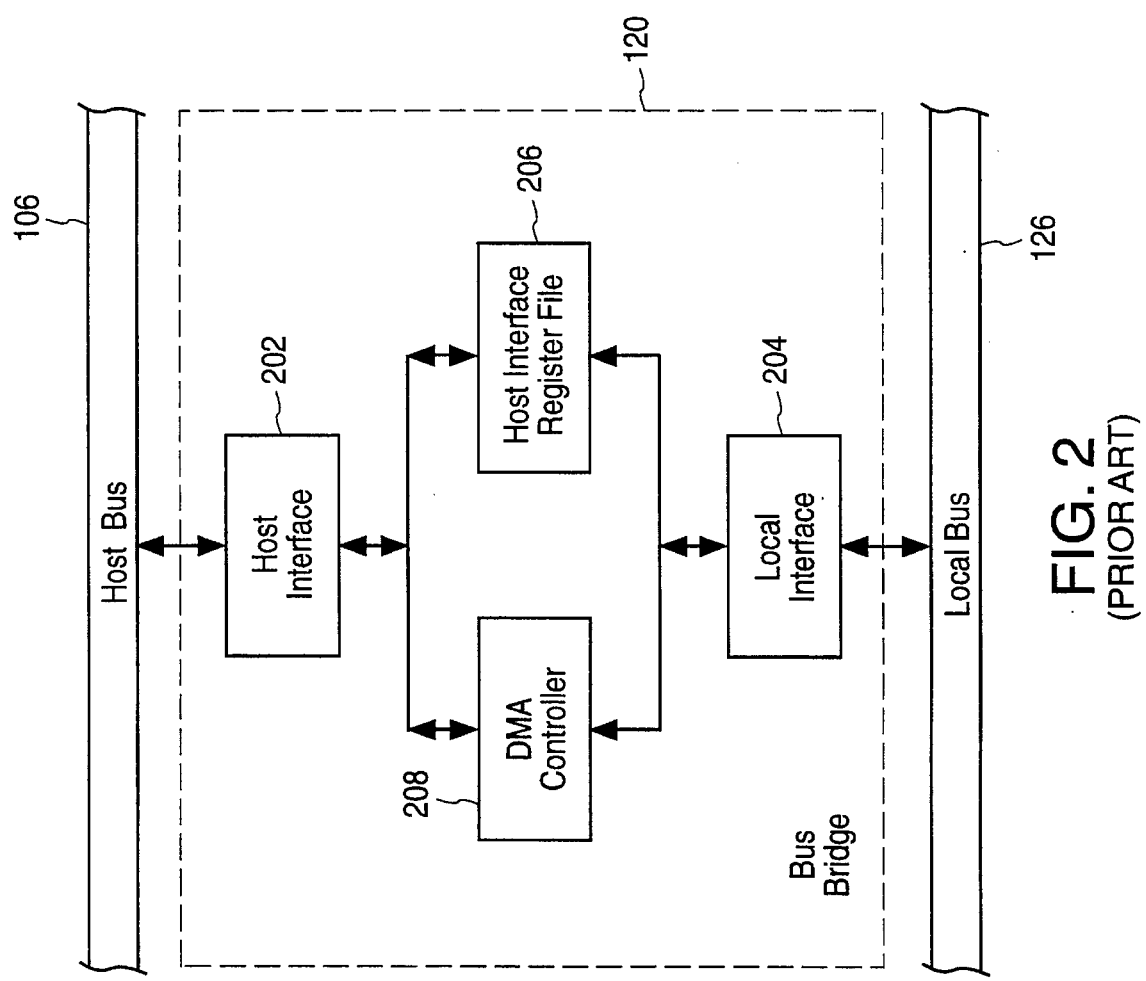
FIG. 2 is a block diagram that illustrates a bus bridge incorporated as an integral part of the typical caching disk controller of FIG. 1.

Referring collectively to FIGS. 3 and 4, the operation of disk controller 304 during a read request by host processor 302 is next considered. If host processor 302 desires to read a sector of data from one of the SCSI devices 306A–306D, a sector read request is transmitted by the host processor 302 and is written into the host interface register file 406 of snooping bus bridge 320. Snooping bus bridge 320 accordingly asserts an interrupt to alert local processor 322 of the pending request. Local processor 322 responsively reads the pending request within the host register file 406 and, upon determining that the current request is a read request, determines whether the requested sector is contained by local memory 324. If the sector is contained by local memory 324, a cache "hit" has occurred and the local processor 322 causes the zero latency DMA controller 408 to initiate a direct memory access operation to read the requested sector directly from local memory 324. It is noted that this operation (when a cache read hit occurs) is similar to that of the caching disk controller 104 described previously with reference to FIGS. 1 and 2.

If local processor 322 instead determines that the requested sector is not contained within local memory 324, a cache "miss" has occurred and the sector must be read from the appropriate SCSI device 306A–306D. Thus, after local processor 322 determines that a cache-miss occurred, it determines which of the SCSI devices 306A–306D contains the requested sector. Local processor 322 then posts a read request to the corresponding SCSI processor 328 or 330 (or in any other way causes the corresponding SCSI processor 328 or 330 to initiate a read). For example, if the requested sector is contained by SCSI device 306A, local processor 322 issues a read request directed to SCSI processor 328. SCSI processor 328 responsively obtains mastership of local bus 326 and initiates a cycle to transfer the sector of data from SCSI device 306A to local memory 324.

Before (or immediately after) local processor 322 issues the read request to SCSI processor 128 (or to SCSI processor 130, depending upon which SCSI device contains the requested data), local processor 322 sets the zero latency DMA controller 408 with the starting and ending addresses of the requested data to be transferred from the SCSI device to local memory 324. As will be explained in greater detail below, as the requested data is being transferred from the SCSI device to cache memory 234, the zero latency DMA controller 408 snoops the local PCI bus 326. While snooping local PCI bus 326, the zero latency DMA controller 326 captures each byte (or word) of requested data as it is being transferred to local memory 324. After the data has been captured, the zero latency DMA controller 408 transfers the data to system memory 303 via host PCI bus 306. By snooping the local PCI bus 326, zero latency DMA controller 408 is not required to execute a read cycle to read the data from local memory 324, and need not wait for the entire line of data to be transferred from the SCSI device to local memory 324.

Figure 5:
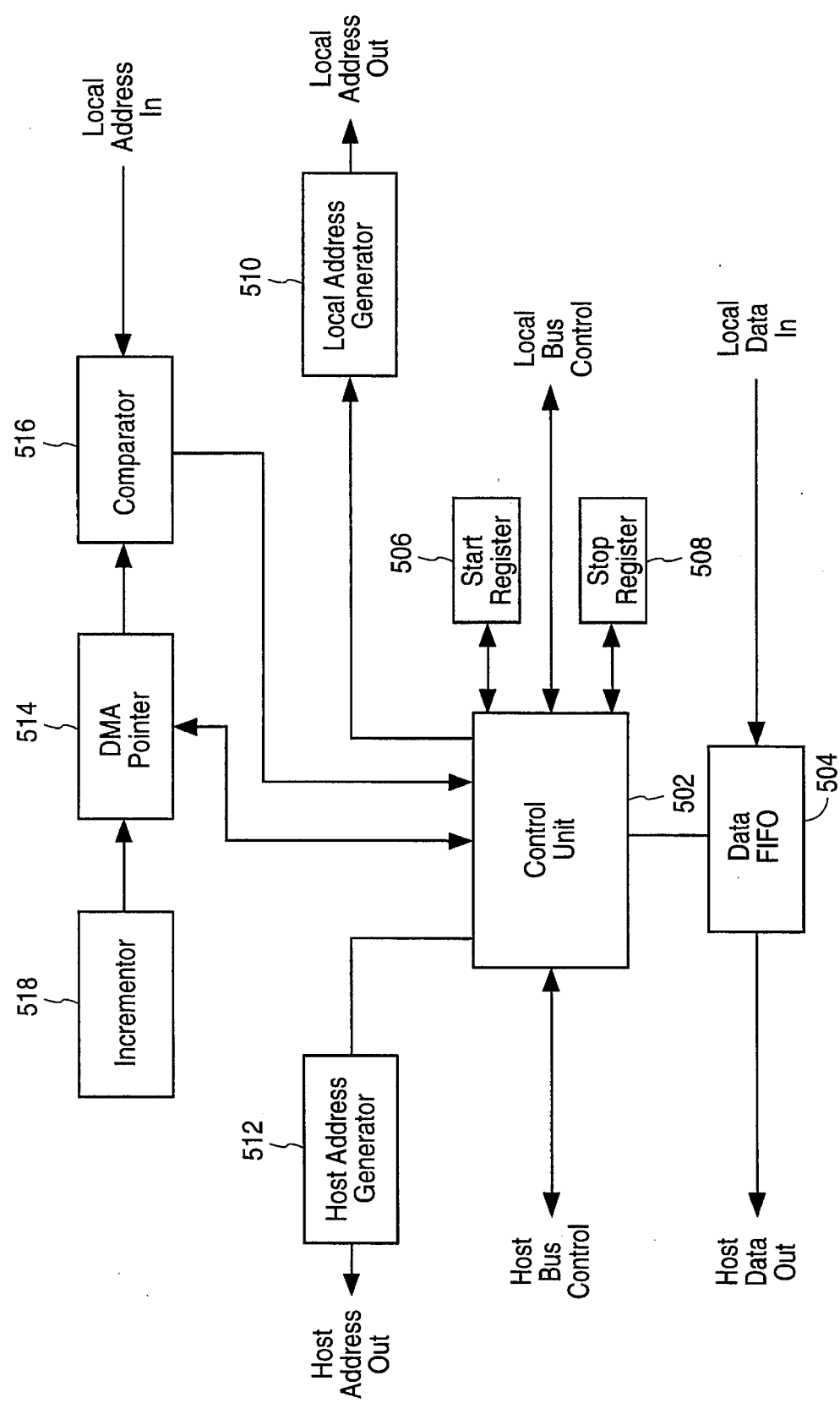
FIG. 5 is a block diagram of one implementation of a zero latency DMA controller embodied within the bus bridge of FIG. 4.

FIG. 5 is a block diagram that illustrates one implementation of the zero latency DMA controller 408. As illustrated in the figure, the zero latency DMA controller 408 includes a control unit 502 coupled to a data FIFO 504, a start register 506, a stop register 508, and a local address generator 510. Control unit 502 is further coupled to a host address generator 512, a DMA pointer 514, and a comparator 516. An incrementor 518 is finally shown coupled to DMA pointer 514.

Referring collectively to FIGS. 3–5, the operation of the zero latency DMA controller 408 is next considered in greater detail. As stated previously, if local processor 322 determines that a pending operation within host interface register file 406 is a read miss, local processor 322 sets the starting and ending address values of the requested data within zero latency DMA controller 320. These starting and ending address values are written to start register 506 and stop register 508, respectively. The start address value is further stored within DMA pointer 514.

After the starting address value has been stored within DMA pointer 514, the requested data may begin to be transferred from the designated SCSI device 306A–306D to local memory 324 at any time, depending upon the read latency associated with the SCSI device and the cache-line ordering. When the data becomes available at the designated SCSI device 306A–306D, it is sequentially transferred from the SCSI device to local memory 324. Control unit 502 snoops the local PCI bus 326 during this transfer to determine whether requested data is currently being transferred. Specifically, the address of local PCI bus 326 is compared by comparator 516 to the value within DMA pointer 514. Since the value initially stored within DMA pointer 514 corresponds to the starting address value, when the first byte (or word) of the requested data is transferred from the designated SCSI device to local memory 324, comparator 516 provides a control signal indicating an address match to control unit 502. Control unit 502 responsively causes the data to be latched within data FIFO 504. Incrementor 518 subsequently causes the address of DMA pointer 514 to increment. In accordance, when the next byte of data is transferred from the SCSI device 106A–106D, another address match is indicated by comparator 502, and control unit 504 causes the additional byte of data to be latched into data FIFO 504. Similar operations occur for subsequent bytes of data.

After data has been latched into data FIFO 504, control unit 502 requests mastership of the host PCI bus 506. Once mastership has been attained, control unit 502 initiates a write cycle to sequentially transfer data stored by data FIFO 504 to system memory 303 on a first-in first-out basis. It is noted that the transfer of data from data FIFO 504 may be accomplished by executing burst write cycles on host PCI bus 306, and thus that control unit 502 may wait until an adequate number of bytes have been transferred into data FIFO 504 before mastership of host PCI bus 306 is requested. High bandwidth transfers on host PCI bus 306 may thereby be attained. It is further noted that host address generator 512 generates an appropriate address to be driven on host PCI bus 306 during each burst write cycle.

After the last byte of requested data has been transferred to local memory 324 from the designated SCSI device 106A–106D, the DMA pointer increments beyond the value stored by stop register 508. This causes control unit 502 to terminate the snooping operation of local PCI bus 326. Subsequently, the remaining bytes of data stored within data FIFO 504 are sequentially transferred to system memory 303. This completes the read request initiated by host processor 302. Additional sectors of data that comprise the cache line may continue to be transferred from the SCSI device to local memory 324 at this time. However, the host processor 302 need not wait for this transfer to complete before using the requested data.

It is noted that for the embodiment of FIG. 3, the host PCI bus 306 is associated with a relatively high bandwidth and the SCSI devices 306A–306D are relatively slow. Accordingly, by sizing data FIFO 504 appropriately, control unit 502 is capable of ensuring that data within data FIFO 504 is transferred to system memory 303 before the data FIFO 504 can be completely filed with data from a SCSI device 306A–306D. As a result, empty storage locations always remain within data FIFO 504 to accommodate the storage of additional data from local PCI bus 326.

In accordance with the caching disk controller 104 described above, data transferred from a SCSI device to the cache memory is captured by bus bridge 320 for subsequent transfer to the host processor 302. Requested data can thereby be provided to the host processor 302 expeditiously, while the data is further stored within the local memory 324 to accommodate high hit rates during subsequent transfers. Overall improved performance of the computer system 320 may thereby be attained.

Figure 6:
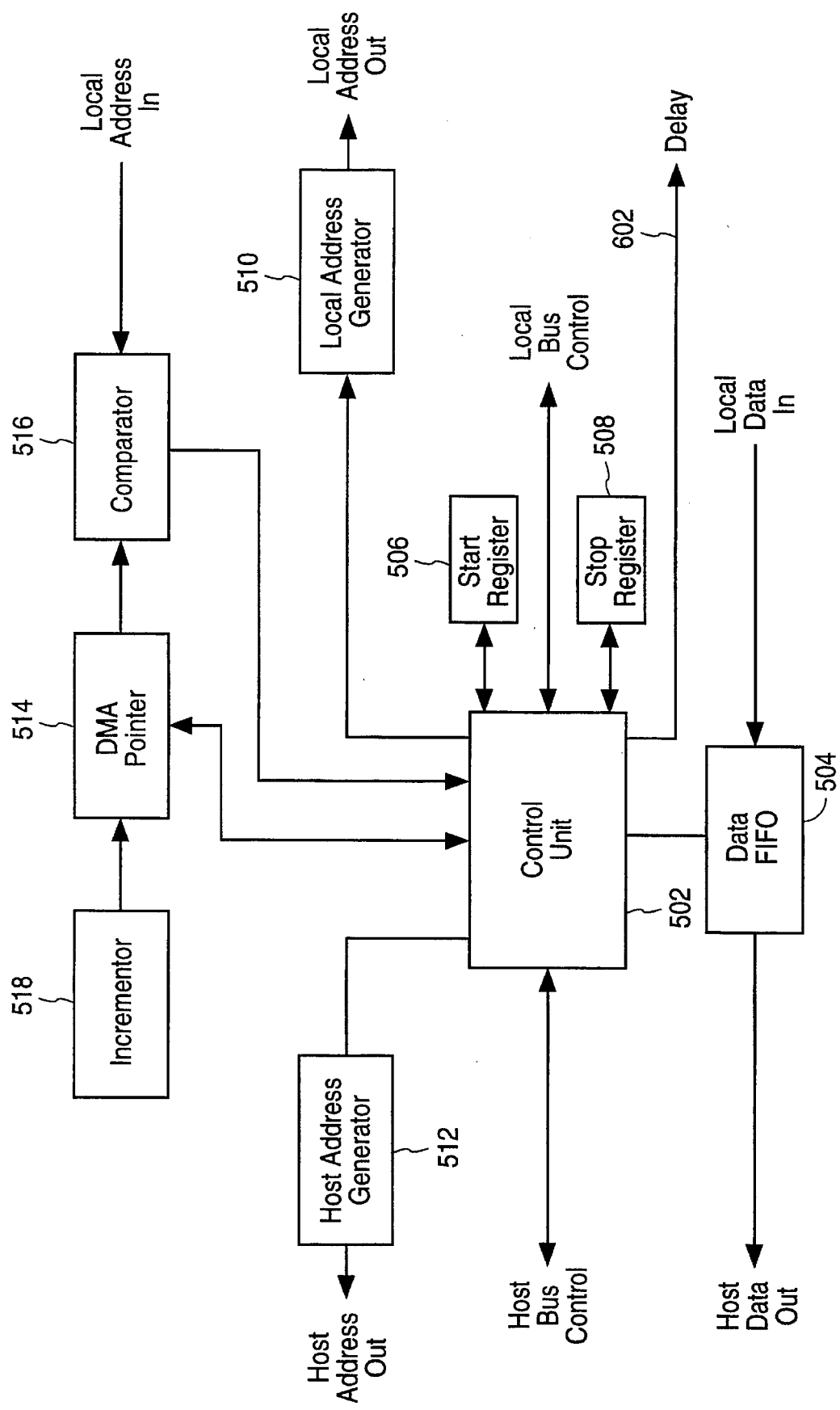
FIG. 6 is a block diagram of a second implementation of a zero latency DMA controller embodied within the bus bridge of FIG. 4.

FIG. 6 is a block diagram that illustrates an alternative embodiment of the zero latency DMA controller 408. Circuit portions that correspond to those of FIG. 5 are numbered identically for simplicity.

The zero latency DMA controller 408 of FIG. 6 may be provided for situations in which there is a possibility that data FIFO 504 may become filled before data can be transferred to system memory 303. The zero latency DMA controller of FIG. 6 is similar to that of FIG. 5; however, the control unit 502 of FIG. 6 is capable of generating a delay signal at line 602. The delay signal is asserted by control unit 502 if data FIFO 504 is at (or near) its maximum capacity. The delay signal is provided to local memory 324 to prevent additional data from being accepted by local memory 324 until the delay signal has been deasserted. This is implemented by controlling the response of ready signals from the local memory 324. Thus, when the delay signal is asserted, wait states are effectively inserted into the memory cycles to prevent (or slow down) the transfer of data into local memory 324. When data from the data FIFO 504 is subsequently transferred to system memory 303, the delay signal is deasserted. As a consequence, when the data FIFO 504 is at or near its maximum capacity, additional data is not transferred by the designated SCSI device 306A–306D until after the control unit 502 has obtained mastership of host PCI bus 306 and has transferred at least some of the data from data FIFO 504 to system memory 303. Additional spaces within data FIFO 504 are thereby made available to accommodate the subsequent data.

Figure 7:
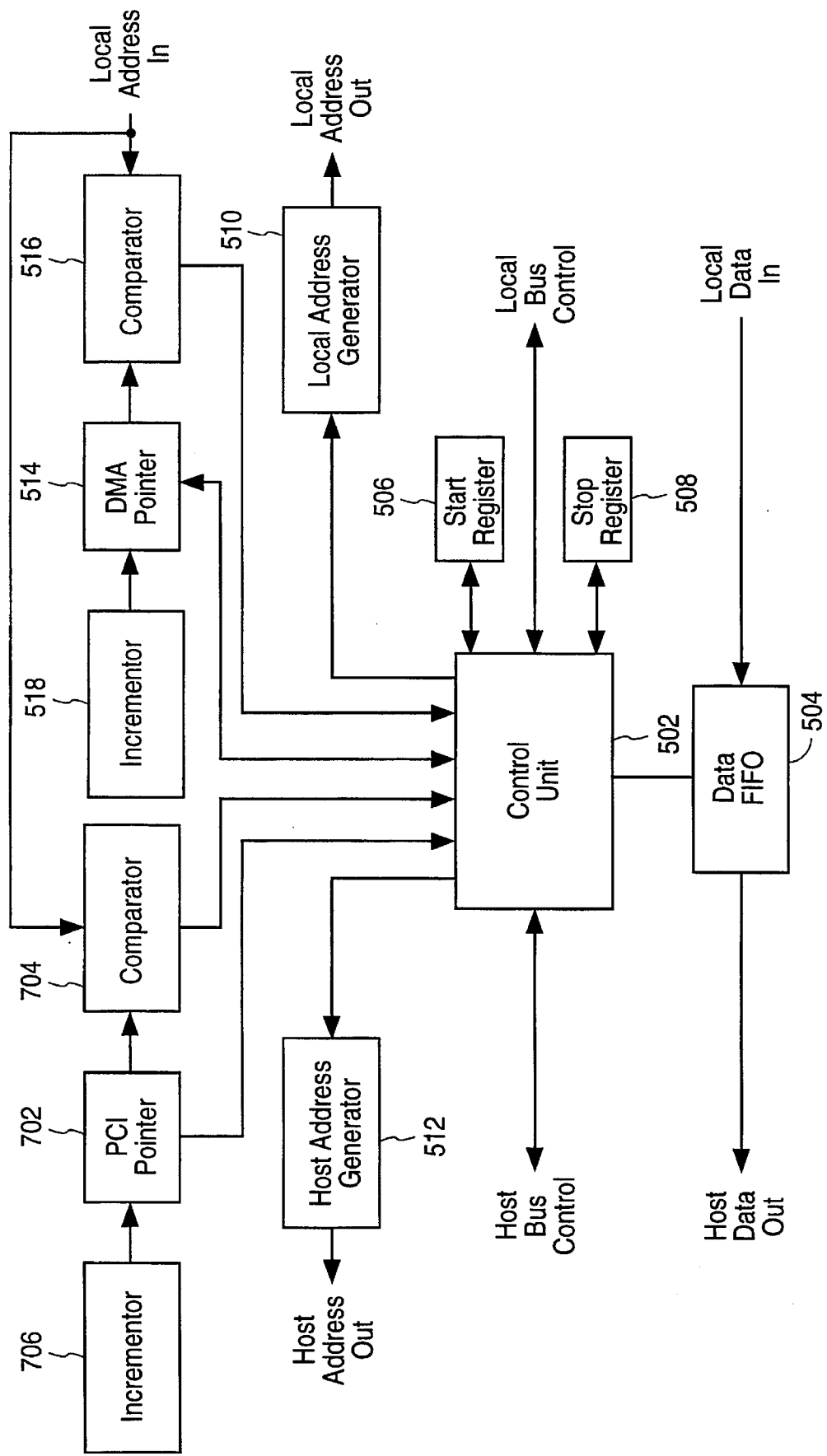
FIG. 7 is a block diagram of a third implementation of a zero latency DMA controller embodied within the bus bridge of FIG. 4.

FIG. 7 is a block diagram that illustrates yet another embodiment of zero latency DMA controller 408. Circuit portions that correspond to those of FIG. 5 are numbered identically. In addition to the circuit portions illustrated in FIG. 5, the zero latency DMA controller 408 of FIG. 7 further includes a Local PCI pointer 702 and a comparator 704 coupled to control unit 502. An incrementor 706 is further coupled to Local PCI pointer 702.

Similar to the implementation of FIG. 6, the zero latency DMA controller 408 as illustrated in FIG. 7 is provided to maintain proper data transfers when data FIFO 504 fills to a predetermined maximum level. The operation of the zero latency DMA controller is identical to that of FIG. 5 when the data FIFO 504 is not completely filled.

During operation, the Local PCI pointer 702 is initially loaded with the starting address value of the requested data (as is also initially stored within the DMA pointer 514). As each byte (or word) of data is transferred from a designated SCSI device 306A–306D to local memory 324, the Local PCI pointer increments along with the DMA pointer 514. However, if data FIFO 504 becomes completely filled with data, DMA pointer 514 stops incrementing even though subsequent words of data may continue to be transferred from the designated SCSI device 306A–306D to local memory 324. It is noted that since data FIFO 504 is already completely filled, the subsequent words of data cannot be latched into data FIFO 504 until data has been unloaded from data FIFO 504. While DMA pointer 514 stops incrementing after the data FIFO 504 is completely filled, the Local PCI pointer 702 keeps incrementing as each subsequent word of data is transferred on local PCI bus 324 to local memory 324. When control unit 502 has attained mastership of host PCI bus 306 and has transferred at least some of the data within data FIFO 504 into system memory 303, the control unit 502 requests mastership of the local PCI bus 326. Upon a grant of mastership, control unit 502 causes a DMA transfer of the data stored within local memory 324 into data FIFO 504 starting at the address of DMA pointer 514. Following each transfer, the DMA pointer 514 is incremented. It is noted that at this point, the Local PCI pointer 702 does not increment, and thus the DMA pointer 514 is allowed to effectively "catch up" to the value of the Local PCI pointer 702. Additional read operations to local memory 324 are executed until DMA pointer 514 again equals the value of Local PCI pointer 702. At this point, control unit 502 releases mastership of local PCI bus 326, and the zero latency DMA controller 408 again proceeds to snoop the local PCI bus 326 and latches requested data within data FIFO 504 for subsequent transfer to system memory 303. It is noted that if data FIFO 504 again completely fills, the DMA pointer again stops incrementing, and Local PCI pointer 702 tracks the ongoing data transfers from the designated SCSI device to local memory 324. The zero latency DMA controller 408 thereafter catches up to the current address of data being transferred in the manner described above. The process continues until the DMA pointer increments beyond the value stored by stop register 508, at which point the latching of the requested data from local PCI bus 326 into data FIFO 504 is complete.

It is also noted that the present invention may be implemented in conjunction with a variety of other bus transfer techniques and alternative system configurations. For example, the present invention may be implemented in conjunction with systems which utilize alternate bus protocols such as EISA, ISA and IDE, among others. In addition, the zero latency transfer apparatus as described above may be embodied within other peripheral controllers such as, for example, CD-ROM controllers and LAN (Local Area Network) controllers.

It is finally noted that computer-aided design tools may be employed to reduce the block diagrams of FIGS. 3–7 to sequential logic circuitry. Exemplary computer-aided design tools include the behavioral language Verilog as well as the VHSIC hardware description language.

Numerous variations and modifications will become apparent to those skilled in the art once the above disclosure is fully appreciated. It is intended that the following claims be interpreted to embrace all such variations and modifications.

What is claimed is:

1. An adapter circuit for providing an interface between a host bus of a host computer and a peripheral device comprising:

a local bus;

a memory buffer coupled to said local bus;

at least one processing unit capable of initiating a transfer of selected data from said peripheral device to said memory buffer via said local bus; and a bus bridge coupled between said local bus and said host bus, wherein said bus bridge includes a storage element for temporarily storing data to be transferred to said host bus from said local bus, and a control unit capable of snooping said local bus and causing said selected data to be latched into said storage element when said selected data is being transferred from said peripheral device to said memory buffer.

2. The adapter circuit as recited in claim 1 wherein said bus bridge further includes a comparator circuit and a first address pointer coupled to said control unit, wherein said comparator is capable of comparing an address signal associated with said local bus to a value of said first address pointer.

3. The adapter circuit as recited in claim 2 wherein said control unit is capable of causing a word of data to be latched into said storage element when said value of said first address pointer equals said address signal associated with said local bus.

4. The adapter circuit as recited in claim 3 wherein said bus bridge further includes an incrementor coupled to said first address pointer for incrementing said value of said address pointer in response to latching said word of data within said storage element.

5. The adapter circuit as recited in claim 4 wherein said storage element is a data FIFO.

6. The adapter circuit as recited in claim 4 wherein said bus bridge further includes a second address pointer coupled to said control unit, wherein said first address pointer stops incrementing when said storage element is full while said second address pointer continues to increment as subsequent words of data are transferred from said peripheral device to said memory buffer via said local bus.

7. The adapter circuit as recited in claim 6 wherein said control unit is further capable of obtaining mastership of said local bus when said first address pointer is less than said second address pointer, and wherein said bus bridge further includes a local address generator for reading said subsequent words of data having an address value corresponding to said first address pointer from said memory buffer into said storage element.

8. The adapter circuit as recited in claim 1 wherein said control unit is further capable of asserting a delay signal when said storage element is filled to a predetermined capacity with data, wherein said delay signal causes a delay of said transfer of selected data from said peripheral device to said memory buffer.

9. The adapter circuit as recited in claim 1 wherein said storage element and said control unit are embodied within a DMA controller, wherein said DMA controller is capable of controlling a read request command from said host computer, and is capable of transferring said selected data from said storage element to said host bus of said host computer.

10. A disk controller for providing an interface between a host bus of a host computer and a disk drive comprising:

a local bus;

a memory coupled to said local bus;

at least one processing unit capable of initiating a transfer of selected data from said disk drive to said memory via said local bus; and a bus bridge coupled between said local bus and said host bus, wherein said bus bridge includes a data FIFO for temporarily storing data to be transferred to said host bus from said local bus, and a control unit capable of snooping said local bus and causing said selected data to be latched into said data FIFO when said selected data is being transferred from said disk drive to said memory.

11. The disk controller as recited in claim 10 wherein said bus bridge further includes a comparator circuit and a first address pointer coupled to said control unit, wherein said comparator is capable of comparing an address signal associated with said local bus to a value of said first address pointer.

12. The disk controller as recited in claim 11 wherein said control unit is capable of causing a word of data to be latched into said data FIFO when said value of said first address pointer equals said address signal associated with said local bus.

13. The disk controller as recited in claim 12 wherein said bus bridge further includes an incrementor coupled to said first address pointer for incrementing said value of said address pointer after said word of data is latched into said data FIFO.

14. The disk controller as recited in claim 13 wherein said bus bridge further includes a second address pointer coupled to said control unit, wherein said first address pointer stops incrementing when said data FIFO is full while said second address pointer continues to increment as subsequent words of data are transferred from said disk drive to said memory via said local bus.

15. The disk controller as recited in claim 14 wherein said control unit is further capable of obtaining mastership of said local bus when said first address pointer is less than said second address pointer, and wherein said bus bridge further includes a local address generator for reading said subsequent words of data having an address value corresponding to said first address pointer from said memory into said data FIFO.

16. The disk controller as recited in claim 10 wherein said control unit is further capable of asserting a delay signal when said data FIFO is filled to a predetermined capacity with data, wherein said delay signal causes a delay of said transfer of selected data from said disk drive to said memory.

17. The disk controller as recited in claim 10 wherein said data FIFO and said control unit are embodied within a DMA controller, wherein said DMA controller is capable of controlling a read request command from said host computer, and is capable of transferring said selected data from said memory to said host bus of said host computer.

18. The disk controller as recited in claim 10 wherein said data FIFO and said control unit are embodied within a memory controller, wherein said memory controller is capable of responding to a read request command from said host computer, and is capable of transferring said selected data from said memory to said host bus of said host computer.

19. A method of interfacing data from a peripheral device to a host computer, said method comprising the steps of:

providing a read request from said host computer to a bus bridge via a host bus;

causing selected data to be transferred from said peripheral device to a memory via a local bus;

latching said selected data within a storage element of said bus bridge as said selected data is being transferred from said peripheral device to said memory; and providing said selected data from said bus bridge to said host bus.

20. The method of interfacing data from a peripheral device to a host computer as recited in claim 19 comprising the further steps of:

storing a starting address value within a first address pointer;

storing a word of data within said storage element if an address of data being transferred from said peripheral device to said memory matches said first address pointer.

21. The method as recited in claim 20 comprising the further steps of:

incrementing said first address pointer sequentially as successive words of data are stored within said storage element from said local bus;

stopping incrementing said first address pointer if said storage element is filled; and incrementing a second address pointer as subsequent words of data are transferred from said peripheral device to said memory.

22. The method as recited in claim 21 comprising the further steps of:

requesting mastership of said local bus if said second address pointer is greater than said first pointer;

transferring said subsequent words of data from said memory into said storage element;

incrementing said first address pointer upon the transfer of each word of said subsequent words of data from said memory into said storage element; and releasing said mastership of said local bus when said first address pointer equals said second address pointer.

23. The method of interfacing data from a peripheral device to a host computer as recited in claim 19 comprising the further step of initiating a bus master cycle on said host bus after said selected data has been latched within said storage element of said bus bridge.

24. The method of interfacing data from a peripheral device to a host computer as recited in claim 19 comprising the further step of asserting a delay signal when said data storage element of said bus bridge is filled to a predetermined capacity, wherein said delay signal causes a subsequent transfer of data from said peripheral device to said memory to be delayed.

* * * * *